United States Patent
Kakishima et al.

(10) Patent No.: US 10,009,905 B2
(45) Date of Patent: Jun. 26, 2018

(54) USER EQUIPMENT AND BASE STATION

(71) Applicant: NTT DOCOMO, INC., Tokyo (JP)

(72) Inventors: Yuichi Kakishima, Tokyo (JP); Satoshi Nagata, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days. days.

(21) Appl. No.: 15/125,779

(22) PCT Filed: Dec. 1, 2014

(86) PCT No.: PCT/JP2014/081701
§ 371 (c)(1),
(2) Date: Sep. 13, 2016

(87) PCT Pub. No.: WO2015/141072
PCT Pub. Date: Sep. 24, 2015

(65) Prior Publication Data
US 2017/0006613 A1    Jan. 5, 2017

(30) Foreign Application Priority Data

Mar. 20, 2014  (JP) ................................. 2014-059184

(51) Int. Cl.
*G01R 31/08*  (2006.01)
*H04J 3/00*  (2006.01)
(Continued)

(52) U.S. Cl.
CPC .......... *H04W 72/082* (2013.01); *H04B 7/024* (2013.01); *H04B 7/0408* (2013.01);
(Continued)

(58) Field of Classification Search
CPC . H04W 72/085; H04B 7/0413; H04B 7/0495; H04B 7/0456; H04B 7/0482
See application file for complete search history.

(56) References Cited

U.S. PATENT DOCUMENTS

| 2001/0003443 A1* | 6/2001 | Velazquez | G01S 19/06 342/367 |
| 2006/0233131 A1* | 10/2006 | Gore | H04B 1/7143 370/328 |

(Continued)

OTHER PUBLICATIONS

International Search Report issued in PCT/JP2014/081701, dated Feb. 24, 2015 (2 pages).

(Continued)

*Primary Examiner* — Brian Roberts
*Assistant Examiner* — Abu-Sayeed Haque
(74) *Attorney, Agent, or Firm* — Jonathan P. Osha (57) ABSTRACT

The present disclosure relates to techniques for reducing flash light effect in 3D MIMO. One aspect of the present invention relates to user equipment, comprising: a transmission and reception unit configured to receive an interference beam candidate list including directional beams transmitted from a camped base station and interference beam candidates transmitted from an adjacent base station; a measurement unit configured to measure reception quality of reference signals transmitted in the respective directional beams in the received interference beam candidate list; and an interference information generation unit configured to generate interference information based on the measured reception quality, wherein the transmission and reception unit indicates the generated interference information to the camped base station or the adjacent base station.

10 Claims, 4 Drawing Sheets

(51) Int. Cl.
*H04W 72/08* (2009.01)
*H04W 76/14* (2018.01)
*H04W 16/28* (2009.01)
*H04B 7/024* (2017.01)
*H04B 7/0408* (2017.01)
*H04B 7/06* (2006.01)
*H04B 7/0413* (2017.01)
*H04L 5/00* (2006.01)
*H04W 24/08* (2009.01)
*H04W 76/02* (2009.01)

(52) U.S. Cl.
CPC ......... *H04B 7/0413* (2013.01); *H04B 7/0695* (2013.01); *H04L 5/0048* (2013.01); *H04W 16/28* (2013.01); *H04W 24/08* (2013.01); *H04W 76/023* (2013.01); *H04W 76/14* (2018.02)

(56) References Cited

U.S. PATENT DOCUMENTS

| | | | |
|---|---|---|---|
| 2008/0252898 A1* | 10/2008 | Pfaff .................. | G01B 11/2441 356/457 |
| 2010/0128673 A1* | 5/2010 | Yamazaki ............ | H04B 7/0617 370/328 |
| 2010/0208314 A1* | 8/2010 | Shirakura ............ | G03H 1/0011 359/3 |
| 2011/0268158 A1* | 11/2011 | Miller .................. | H04B 7/2041 375/138 |
| 2012/0115497 A1* | 5/2012 | Tolli ...................... | H04B 7/022 455/452.2 |
| 2012/0140658 A1* | 6/2012 | Kanzaki ............... | H04B 7/0426 370/252 |
| 2014/0098695 A1* | 4/2014 | Jeong .................. | H04B 7/0617 370/252 |
| 2014/0099960 A1* | 4/2014 | Ahmad ................. | H04B 7/022 455/438 |
| 2014/0185483 A1* | 7/2014 | Kim ..................... | H04W 24/02 370/252 |
| 2015/0236772 A1* | 8/2015 | Hammarwall ....... | H04B 7/0617 370/329 |

OTHER PUBLICATIONS

Written Opinion of the International Searching Authority issued in PCT/JP2014/081701, dated Feb. 24, 2015 (3 pages).

3GPP TS 36.211 V12.0.0; "3rd Generation Partnership Project; Technical Specification Group Radio Access Network; Evolved Universal Terrestrial Radio Access (E-UTRA); Physical channels and modulation (Release 12)"; Dec. 2013 (120 pages).

* cited by examiner

CASE WHERE MULTIPLE ELEMENT GROUP IS 1 AP (4 ELEMENTS CORRESPOND TO 2 AP) (32 AP)

TWO-DIMENSIONAL ARRANGEMENT OF ORTHOGONAL POLARIZATION ELEMENTS (128 AP)

TWO-DIMENSIONAL ARRANGEMENT OF UNIFORM POLARIZATION ELEMENTS (64 AP)

USER EQUIPMENT AND BASE STATION

TECHNICAL FIELD

The present invention relates to a radio communication system.

BACKGROUND ART

In Releases 8-11 of 3GPP (Third Generation Partnership Project), techniques for forming beams in the horizontal direction at a base station having multiple horizontally arranged antenna ports are employed. Also in Release 12, in order to further improve system characteristics, beam forming techniques (3D MIMO (Multiple-Input Multiple-Output)) are being discussed by using multiple arbitrarily arranged antenna ports where the horizontal arrangement is more generalized. For example, techniques for forming beams not only in the horizontal direction but also in the vertical direction at a base station having multiple antenna ports two-dimensionally arranged in the horizontal and vertical directions are being discussed.

Figure 1:
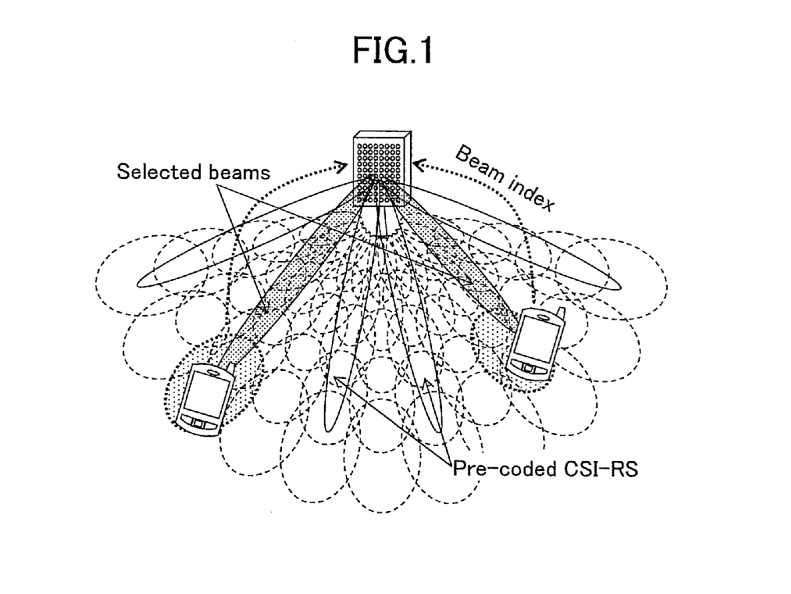
FIG. 1 is a schematic diagram for illustrating beam forming in the 3D MIMO.

In the 3D MIMO with such arbitrarily arranged antenna ports, a base station uses multiple antenna ports arranged in a predetermined beam arrangement to form directional beams in the horizontal and vertical directions. As illustrated in FIG. 1, the base station transmits directional beams, that is, precoded signals from the respective antenna ports. In the illustrated example, the base station transmits precoded CSI-RSs (Channel State Information-Reference Signals) for reception quality measurement at user equipment as the precoded signals. The user equipment measures reception quality of the precoded CSI-RSs transmitted from the respective antenna ports, selects a directional beam having good reception quality (for example, a directional beam having the maximum reception power) based on the measured reception quality and feeds a beam index of the selected directional beam back to the base station.

As implementations of the 3D MIMO, vertical beam forming and FD (Full Dimension)-MIMO are known. In 3GPP specifications, the case where the number of transmission antenna ports is smaller than or equal to 8 is referred to as the vertical beam forming, and the case where the number of transmission antenna ports is greater than 8 (such as 16, 32 and 64) is referred to as the FD-MIMO. In the future, it is assumed that more than hundreds to ten thousands of antennas may be used (Massive MIMO or Higher-order MIMO).

See 3GPP TS 36.211 V12.0.0 (2013-12) for details of the 3D MIMO, for example.

SUMMARY OF INVENTION

Problem to be Solved by the Invention

In this manner, base stations transmit highly directional beams in the 3D MIMO, and accordingly, a so-called flash light effect may arise. Specifically, interference power caused by beam forming in adjacent base stations may become very strong instantaneously or in a burst manner, which may affect communication between user equipment and a camped base station.

In light of the above problem, one object of the present invention is to provide techniques for reducing the flash light effect in the 3D MIMO.

Means for Solving the Problem

In order to achieve the above object, one aspect of the present invention relates to user equipment, comprising: a transmission and reception unit configured to receive an interference beam candidate list including directional beams transmitted from a camped base station and interference beam candidates transmitted from an adjacent base station; a measurement unit configured to measure reception quality of reference signals transmitted in the respective directional beams in the received interference beam candidate list; and an interference information generation unit configured to generate interference information based on the measured reception quality, wherein the transmission and reception unit indicates the generated interference information to the camped base station or the adjacent base station.

Another aspect of the present invention relates to a base station camped in by user equipment, comprising: a transmission and reception unit configured to indicate an interference beam candidate list including directional beams transmitted from the base station and interference beam candidates transmitted from an adjacent base station to the user equipment and transmit reference signals in directional beams in the interference beam candidate list; an interference information acquisition unit configured to acquire interference information from the user equipment; and a transmission control unit configured to control transmission to the user equipment in cooperation with the adjacent base station based on the acquired interference information.

Advantage of the Invention

According to the present invention, it is possible to provide techniques for reducing the flash light effect in the 3D MIMO.

EMBODIMENTS OF THE INVENTION

Embodiments of the present invention are described below with reference to the drawings.

User equipment and a base station for reducing the flash light effect in the 3D MIMO are disclosed. In embodiments as stated below, the user equipment receives an interference beam candidate list including directional beams transmitted from a camped base station and interference beam candidates transmitted from an adjacent base station from the camped base station and measures reception quality of respective reference signals transmitted in the respective directional beams in the received interference beam candidate list. The reference signals transmitted in the directional beams may be precoded reference signals such as precoded CSI-RSs, for example. After that, the user equipment generates interference information indicative of a timing, a frequency position, a beam number or the like for the detected interference based on the measured reception quality and indicates the interference information to the camped base station or the adjacent base station.

Upon receiving the interference information, the camped base station and the adjacent base station cooperate to control transmission to the user equipment so as to avoid occurrence of interference. For example, the camped base station and the adjacent base station may cooperate to control transmission to the user equipment such that a transmission timing or a transmission frequency of a directional beam from the adjacent base station determined by the user equipment as being an interference beam cannot overlap with a transmission timing or a transmission frequency of a directional beam from the camped base station. In this manner, the flash light effect from the adjacent base station arising from usage of the highly directional beams can be reduced.

Figure 2:
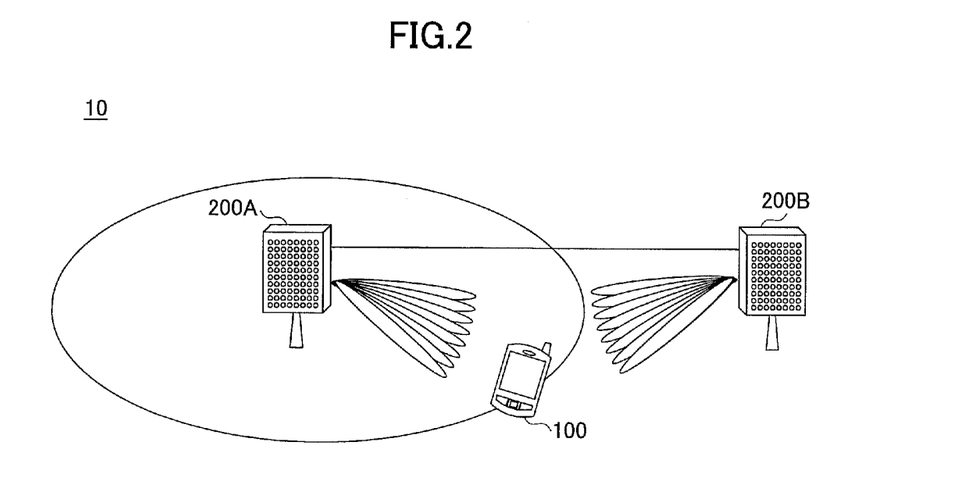
FIG. 2 is a schematic diagram for illustrating a radio communication system according to one embodiment of the present invention.

A radio communication system according to one embodiment of the present invention is described with reference to FIG. 2. The radio communication system according to embodiments as stated below supports 3D MIMO communication. FIG. 2 is a schematic diagram for illustrating a radio communication system according to one embodiment of the present invention.

As illustrated in FIG. 2, the radio communication system 10 has user equipment (UE) 100 and base stations (eNBs) 200A, 200B (collectively referred to as the base station 200). In the illustrated embodiment, the radio communication system 10 has only the single user equipment 100 and the two base stations 200A, 200B, but it typically has a large number of user equipments 100 and a large number of base stations 200. Specifically, the large number of base stations 200 are disposed to cover a service area of the radio communication system 10, and the respective user equipments 100 communicatively connect for any of the base stations 200 and perform MIMO communication with the connecting base stations 200. In the illustrated embodiment, the user equipment 100 is camped in a cell of the base station 200A and performs the MIMO communication with the base station 200A. Also, the base station 200B is disposed adjacently to the base station 200A, and the base station 200A and the base station 200B are communicatively connected to each other via a backhaul.

The user equipment 100 uses the 3D MIMO to communicate with the base station 200. The user equipment 100 is typically a mobile phone, a smartphone, a tablet, a mobile router or the like, but is not limited to it, may be any appropriate user equipment with a radio communication function. In a typical hardware arrangement, the user equipment 100 has a CPU (Central Processing Unit) such as a processor, a memory device such as a RAM (Random Access Memory), an auxiliary storage device such as a hard disk device, a communication device for communicating radio signals, an interface device for interfacing with users, and so on. Functions of the user equipment 100 as stated below may be implemented by the CPU loading data and programs stored in the auxiliary storage device via the communication device and/or the interface device into the memory device and processing the data in accordance with the loaded programs.

Figure 3:
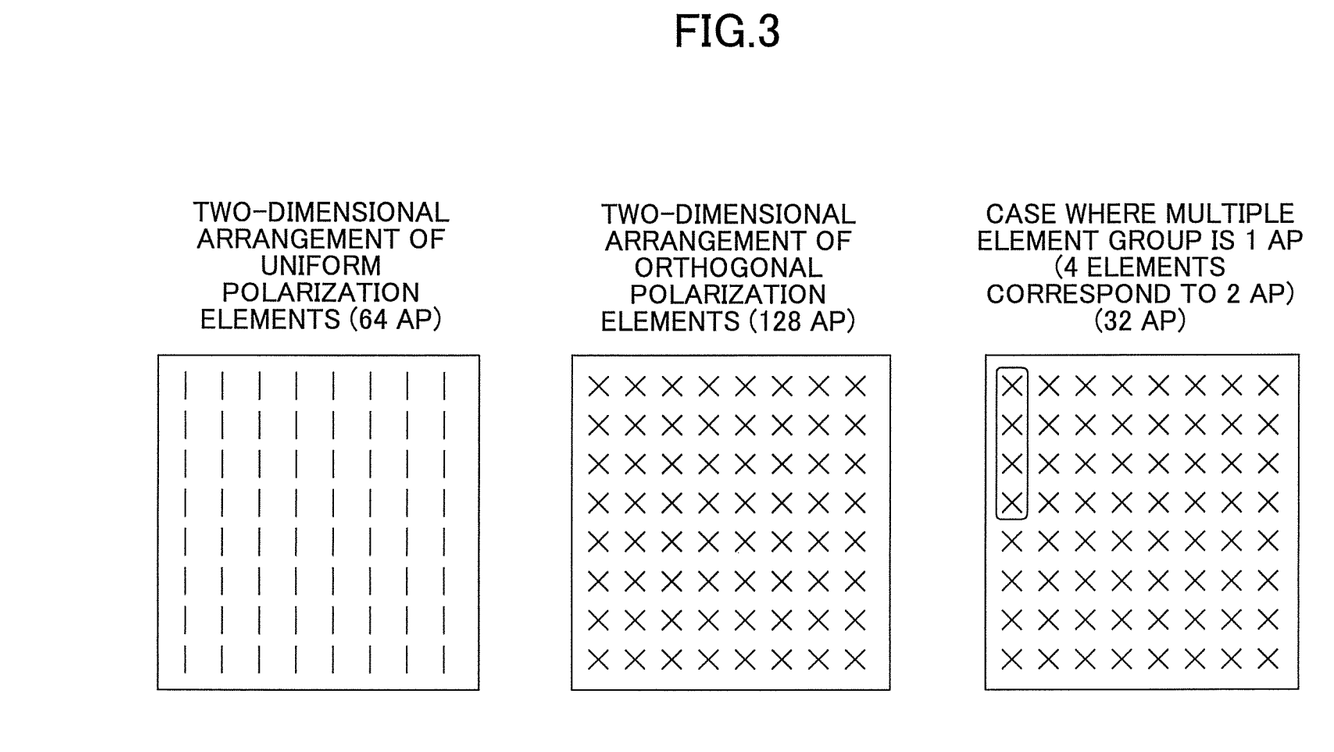
FIG. 3 is a schematic diagram for illustrating exemplary arrangements of antenna elements in a base station according to one embodiment of the present invention.

The base station 200 uses the 3D MIMO to communicate with the user equipment 100. In the illustrated embodiment, the base station 200A is the camped base station for the user equipment 100, and the base station 200B is the adjacent base station disposed adjacently to the camped base station 200A. The base station 200 uses multiple antenna ports arranged in a predetermined beam arrangement to form directional beams. For example, as illustrated in FIG. 3, the base station 200 uses multiple antenna ports two-dimensionally arranged in the horizontal and vertical directions to form directional beams in the horizontal and vertical directions. These antenna ports (APs) may be composed of antenna elements using uniform polarization elements or orthogonal polarization elements. For example, in the left side illustration in FIG. 3, the uniform polarization elements are two-dimensionally arranged as illustrated, and 64 antenna ports are formed. Also in the middle illustration in FIG. 3, orthogonal polarization elements are two-dimensionally arranged as illustrated, and 128 antenna ports are formed. Furthermore, in the right side illustration in FIG. 3, orthogonal polarization elements are two-dimensionally arranged as illustrated, and one antenna port is formed of multiple elements. The base station 200 is not limited to the illustrated antenna element arrangements, and any appropriate antenna element arrangement that can form multiple directional beams to cover a cell of the base station 200 by using multiple antenna ports may be used. For example, the antenna elements may be arranged in either the horizontal direction or the vertical direction.

The base station 200A transmits various signals, such as data signals and control signals, to the user equipment 100 in directional beams from respective antenna ports and receives various signals, such as data signals and control signals, from the user equipment 100 via the antenna ports. In the 3D MIMO, in order to improve data transmission efficiency, the base station 200A uses an appropriate directional beam corresponding to the position of the user equipment 100 to transmit signals to the user equipment 100. In order to determine a directional beam suitable for the user equipment 100, the base station 200A transmits precoded references signals for reception quality measurement at the user equipment 200 by transmitting directional beams from the respective antenna ports. Also, the base station 200A transmits reference signals in directional beams in cooperation with the adjacent base station 200B to determine an interference with directional beams transmitted from the adjacent base station 200B.

In one embodiment, the base stations 200A, 200B transmit precoded CSI-RSs (Channel State Information-Reference Signals) as the precoded reference signals for reception quality measurement. In general, a precoded signal increases beam gain but narrows a beam width. Accordingly, a number of beam directions almost proportional to the number of antenna elements are required for omnidirectional coverage of the base stations 200A, 200B (for example, twice the number of beam directions compared to the number of antenna elements), and if a large number of antenna elements are used, it is necessary to form a large number of directional beams or precoded reference signals.

The user equipment 100 measures reception quality of the precoded CSI-RSs transmitted from the respective antenna ports in the base stations 200A, 200B and selects a directional beam having good reception quality based on the measured reception quality. Note that the reference signal transmitted in a directional beam is not limited to the CSI-RS and may be a PSS (Primary Synchronization Signal), a SSS (Secondary Synchronization Signal), an Enhanced SS, a Discovery signal, a DM-RS (Data Demodulation-Reference Signal) or the like.

In one embodiment, for example, the user equipment 100 may select a directional beam having the maximum reception power or the best SINR or select a directional beam to be applied to simultaneously multiplexed UEs in MU (Multi User)-MIMO or a directional beam having low interference from other users. The user equipment 100 feeds a beam index of the selected directional beam back to the base station 200. Here, the beam indices of the respective directional beams are indicated from the base station 200 and are associated with timings and/or frequencies for transmitting the respective directional beams, for example. Upon receiving the feedback information, the base station 200 uses an antenna port corresponding to the indicated beam index to communicate with the user equipment 100.

Figure 4:
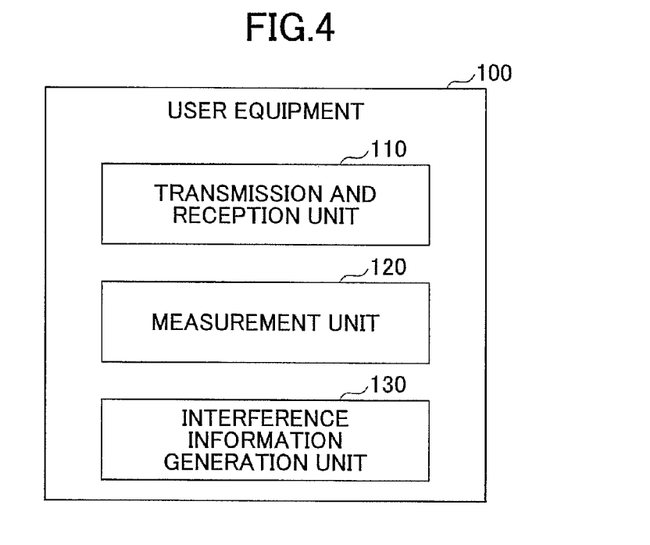
FIG. 4 is a block diagram for illustrating an arrangement of user equipment according to one embodiment of the present invention.

Next, user equipment according to one embodiment of the present invention is described with reference to FIG. 4. FIG. 4 is a block diagram for illustrating an arrangement of the user equipment according to one embodiment of the present invention.

As illustrated in FIG. 4, the user equipment 100 has a transmission and reception unit 110, a measurement unit 120 and an interference information generation unit 130. As stated above in conjunction with FIG. 2, the user equipment 100 is camped in the base station 200A.

The transmission and reception unit 110 receives an interference beam candidate list including directional beams transmitted from the camped base station 200A and interference beam candidates transmitted from the adjacent base station 200B. Specifically, the camped base station 200A requests the adjacent base station 200B to indicate directional beams from the adjacent base station 200B that may interfere with the resident user equipment 100 and receives a list of interference beam candidates from the adjacent base station 200B. For example, the adjacent base station 200B may identify a directional beam transmitted toward the camped base station 200A as the interference beam candidate and indicate the identified interference beam candidate to the camped base station 200A.

Figure 5:
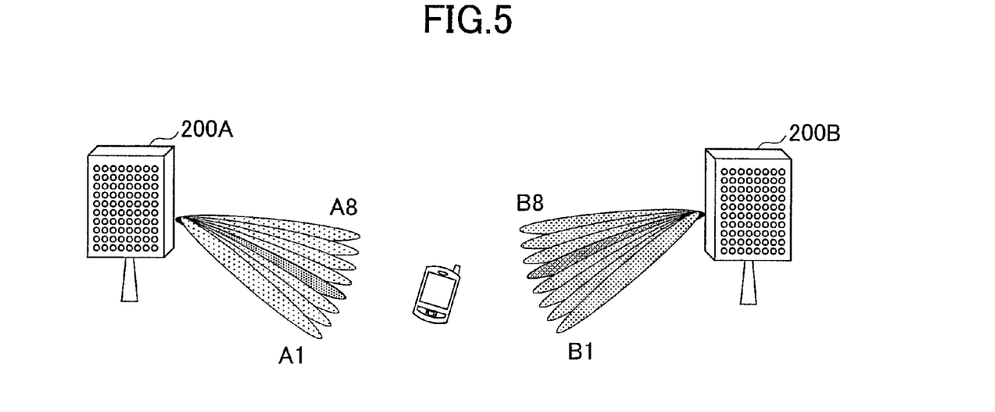
FIG. 5 is a schematic diagram for illustrating interference with an adjacent base station according to one embodiment of the present invention.

Alternatively, if the adjacent base station 200B obtains location information of the user equipment 100 from the camped base station 200A, the adjacent base station 200B may identify a directional beam transmitted toward the user equipment 100 as the interference beam candidate and indicate the identified interference beam candidate to the camped base station 200A. The camped base station 200A indicates the interference beam candidates, which are composed of an interference beam candidate received from the adjacent base station 200B and a directional beam transmitted from the camped base station 200A, to the user equipment 100. In the embodiment as illustrated in FIG. 5, the camped base station 200A indicates directional beams A1 to A8 transmitted from the camped base station 200A and interference beam candidates B1 to B8 transmitted from the adjacent base station 200B as the interference beam candidates.

Here, the camped base station 200A may indicate only the interference beam candidates B1 to B8 transmitted from the adjacent base station 200B as the interference beam candidates. Since the camped base station 200A periodically transmits reference signals and obtains feedback information from the user equipment 100, the user equipment 100 can measure interference with the respective interference beams in the interference beam candidate list transmitted from the adjacent base station 200B during the periodic transmission of the reference signals from the camped base station 200A.

In one embodiment, according to the interference beam candidate list, the respective directional beams in the interference beam candidate list may be associated with indicators indicative of transmitters of the directional beams. In this case, in response to an interference level of a reference signal transmitted in a directional beam from the adjacent base station 200B being higher than or equal to a predetermined threshold, the transmission and reception unit 110 may indicate interference information generated by the interference information generation unit 130 to the camped base station 200A or the adjacent base station 200B.

However, the present invention is not limited to it, and the user equipment 100 may not necessarily obtain the interference beam candidate list, for example. In this case, the user equipment 100 may identify a level of interference and/or a timing of stronger interference based on a measurement result and indicate the identified interference level and/or timing of stronger interference as the interference information to the camped base station 200A or the adjacent base station 200B. Upon receiving the interference information, the camped base station 200A or the adjacent base station 200B can identify an interference beam based on the received interference information.

The measurement unit 120 measures reception quality of reference signals transmitted in the respective directional beams in the received interference beam candidate list. For example, the reference signal transmitted from the camped base station 200A or the adjacent base station 200B may be a precoded CSI-RS, a PSS, a SSS, an Enhanced SS, a Discovery signal or a DM-RS, and the measurement unit 120 may measure a RSRP (Reference Signal Received Power) of the respective reference signals received from the camped base station 200A and the adjacent base station 200B.

In one embodiment, in order to detect interference from the adjacent base station 200B, the measurement unit 120 may determine an interference level of an interference beam from the adjacent base station 200B by subtracting reception power of reference signals transmitted from the camped base station 200A from total reception power of reference signals transmitted from the camped base station 200A and the adjacent base station 200B. For example, if the DM-RS is used as the reference signals, the user equipment 100 can identify transmission power of the camped base station 200A transmitting the DM-RS from the received DM-RS. Accordingly, the measurement unit 120 can determine reception power of an interference beam from the adjacent base station 200B by subtracting the identified transmission power of the camped base station 200A from reception power (total reception power) measured for the reference signals transmitted from the camped base station 200A and the adjacent base station 200B.

In another embodiment, in order to detect interference from the adjacent base station 200B, the measurement unit 120 may measure reception power of reference signals transmitted from the adjacent base station 200B during stopping transmission from the camped base station 200A. For example, the measurement unit 120 may measure reception power of precoded CSI-RSs transmitted from the adjacent base station 200B during stopping transmission from the camped base station 200A and determine the measured reception power as an interference level from the adjacent base station 200B (zero-power CSI-RS). Here, the measurement unit 120 may obtain information indicative of a period where no directional beam is transmitted from the camped base station 200A beforehand.

The interference information generation unit 130 generates interference information based on the measured reception quality. The generated interference information is indicated by the transmission and reception unit 110 to the camped base station 200A or the adjacent base station 200B. For example, the interference information may include a timing, a frequency position, a beam index and/or reception quality where the interference from the adjacent base station 200B has been detected.

The interference information generated by the interference information generation unit 130 is indicated by the transmission and reception unit 110 to the camped base station 200A or the adjacent base station 200B. In one embodiment, if communication has been established between the user equipment 100 and the camped base station 200A, the transmission and reception unit 110 may indicate the interference information to the camped base station 200A by multiplexing the interference information into channel state information or acknowledgement. For example, the transmission and reception unit 110 may include the generated interference information in CSI for feedback or attach the generated interference information to ACK/NACK for feedback. In another embodiment, the transmission and reception unit 110 may indicate the interference information to the camped base station 200A by multiplexing the interference information into an uplink data signal. For example, the transmission and reception unit 110 may multiplex the generated interference information into a PUSCH (Physical Uplink Shared Channel) for feedback. The interference information fed back in this manner may be indicated by the camped base station 200A to the adjacent base station 200B via a backhaul. The camped base station 200A and the adjacent base station 200B control transmission of directional beams based on the obtained interference information in cooperation with each other appropriately, as stated below.

Alternatively, the transmission and reception unit 110 may transmit the generated interference information to the adjacent base station 200B directly without via the camped base station 200A. In one embodiment, the transmission and reception unit 110 may indicate the interference information to the adjacent base station 200B in a random access channel. The random access channel (RACH) is used to establish connection to the base station 200 at initial access or handover to the base station 200 by the user equipment 100. For example, the transmission and reception unit 110 may use a contention-based RACH to transmit the interference information to the adjacent base station 200B.

Also in another embodiment, the transmission and reception unit 110 may indicate the interference information to the adjacent base station 200B via a D2D (Device to Device) signal for transmission to other user equipments camped in the adjacent base station 200B. Specifically, the user equipment 100 performs inter-UE communication with other user equipments camped in the adjacent base station 200B and includes the generated interference information in the D2D signal to transmit to other user equipments. The adjacent base station 200B can obtain the interference information of the user equipment 100 by monitoring the inter-UE communication, for example. Since the D2D signal has a payload, the transmission and reception unit 110 can include one or more of a timing, a frequency position, a beam index and reception quality of incurred interference in the payload of the D2D signal.

Figure 6:
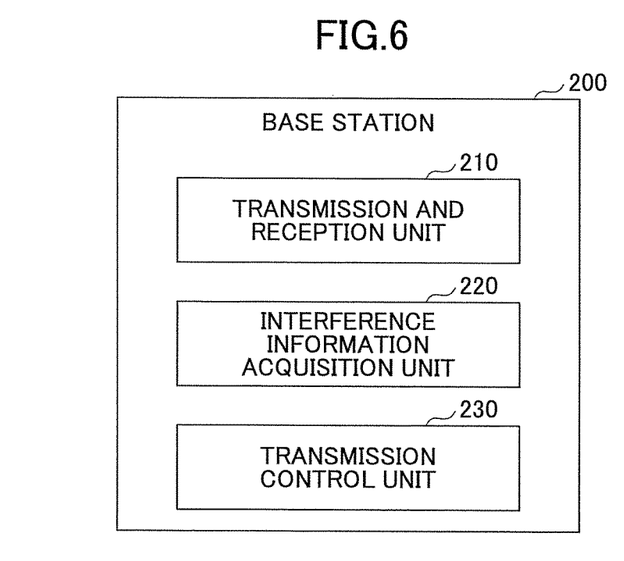
FIG. 6 is a block diagram for illustrating an arrangement of a base station according to one embodiment of the present invention.

Next, the base station according to one embodiment of the present invention is described with reference to FIG. 6. In this embodiment, the base station 200 is mainly described from the standpoint of the camped base station 200A, but the description below of the base station 200 can be similarly applied to the adjacent base station 200B. FIG. 6 is a block diagram for illustrating an arrangement of the base station according to one embodiment of the present invention.

As illustrated in FIG. 6, the base station 200 has a transmission and reception unit 210, an interference information acquisition unit 220 and a transmission control unit 230.

The transmission and reception unit 210 indicates an interference beam candidate list including directional beams transmitted from the camped base station 200A and interference beam candidates transmitted from the adjacent base station 200B to the user equipment 100 and transmits reference signals in directional beams in the interference beam candidate list. The camped base station 200A requests the adjacent base station 200B to indicate directional beams from the adjacent base station 200B that may interfere with the resident user equipment 100 and receives a list of interference beam candidates from the adjacent base station 200B. For example, the adjacent base station 200B may indicate a directional beam transmitted toward the camped base station 200A as the interference beam candidate to the camped base station 200A.

Alternatively, if the adjacent base station 200B obtains location information of the user equipment 100 from the camped base station 200A, the adjacent base station 200B may indicate a directional beam transmitted toward the user equipment 100 as the interference beam candidate to the camped base station 200A. The transmission and reception unit 210 indicates the interference beam candidate list, which is composed of an interference beam candidate received from the adjacent base station 200B and a directional beam transmitted from the transmission and reception unit 210, to the user equipment 100. In the embodiment as illustrated in FIG. 5, the transmission and reception unit 210 indicates directional beams A1 to A8 transmitted from the transmission and reception unit 210 and interference beam candidates B1 to B8 transmitted from the adjacent base station 200B in the interference beam candidate list. As stated above, the transmission and reception unit 210 may indicate only the interference beam candidates B1 to B8 transmitted from the adjacent base station 200B as the interference beam candidates.

In one embodiment, according to the interference beam candidate list, the respective directional beams in the interference beam candidate list may be associated with indicators indicative of transmitter of the directional beams. For example, if a certain directional beam in the interference beam candidate list is transmitted from the camped base station 200A, "0" may be assigned to the indicator associated with the directional beam, and otherwise if the directional beam is transmitted from the adjacent base station 200B, "1" may be assigned to the indicator associated with the directional beam. The user equipment 100 can determine the transmitter of the received reference signal based on the indicator, and if an interference beam from the adjacent base station 200B exceeds a predetermined interference level, it can be determined that the interference has been detected.

However, the present invention is not limited to it, and the base station 200 may not necessarily transmit the interference beam candidate list to the user equipment 100, for example. In this case, the user equipment 100 may identify an interference level and/or a timing of stronger interference based on measurement results and indicate the identified interference level and/or timing of stronger interference as the interference information to the camped base station 200A or the adjacent base station 200B. Upon receiving the interference information, the camped base station 200A or the adjacent base station 200B can identify an interference beam based on the received interference information.

The interference information acquisition unit 220 acquires interference information from the user equipment 100. For example, the interference information may include one or more of a timing, a frequency position, a beam index and reception quality of incurred interference.

The interference information acquisition unit 220 in the camped base station 200A may extract the interference information generated by the user equipment 100 from channel state information or acknowledgement into which the interference information transmitted from the user equipment 100 is multiplexed or an uplink data channel into which the interference information transmitted from the user equipment 100 is multiplexed.

Also, the interference information acquisition unit 220 in the adjacent base station 200B may acquire the interference information from the camped base station 200A or from the user equipment 100 directly without via the camped base station 200A. In the latter case, for example, the interference information acquisition unit 220 in the adjacent base station 200B may acquire the interference information from a RACH transmitted from the user equipment 100. Alternatively, the interference information acquisition unit 220 in the adjacent base station 200B may monitor inter-UE communication between the user equipment 100 and other user equipments camped in the adjacent base station 200B and obtain the interference information from a D2D signal transmitted from the user equipment 100.

The transmission control unit 230 controls transmission to the user equipment 100 in cooperation with the adjacent base station 200B based on the acquired interference information. In one embodiment, the transmission control unit 230 may control transmission to the user equipment 100 such that a transmission timing of an interference beam from the adjacent base station 200B indicated in the interference information does not overlap with a transmission timing of a directional beam from the transmission and reception unit 210.

Specifically, in a period where radio resources are scheduled for the user equipment 100 (for example, a scheduled TTI (Transmission Time Interval)), the transmission control unit 230 may indicate the adjacent base station 200B to stop transmitting an interference beam indicated in the interference information for the period. Accordingly, the camped base station 200A can transmit directional beams to the user equipment 100 in the period where interference cannot arise due to directional beams transmitted from the adjacent base station 200B, and the user equipment 100 can receive the signals transmitted from the camped base station 200A appropriately without incurring the interference due to the directional beams transmitted from the adjacent base station 200B.

In another embodiment, the transmission control unit 230 may indicate the adjacent base station 200B to refrain from transmitting an interference beam of the adjacent base station 200B indicated in the interference information at an indicated timing or period. Upon receiving the indication, the transmission control unit 230 in the adjacent base station 200B stops transmitting an interference beam, where interference has been detected in the user equipment 100, in the timing or period indicated by the camped base station 200A. This timing may be a timing for enabling the user equipment 100 to receive the transmitted signals reliably such as a retransmission timing for retransmission from the camped base station 200A to the user equipment 100. Since it can be estimated that the retransmission is required due to an interference beam from the adjacent base station 200B, it is necessary to stop transmitting the interference beam from the adjacent base station 200B at the retransmission timing. Also, the period may be some period such as a period where the user equipment 100 remains at the current position or a permanent period.

Figure 7:
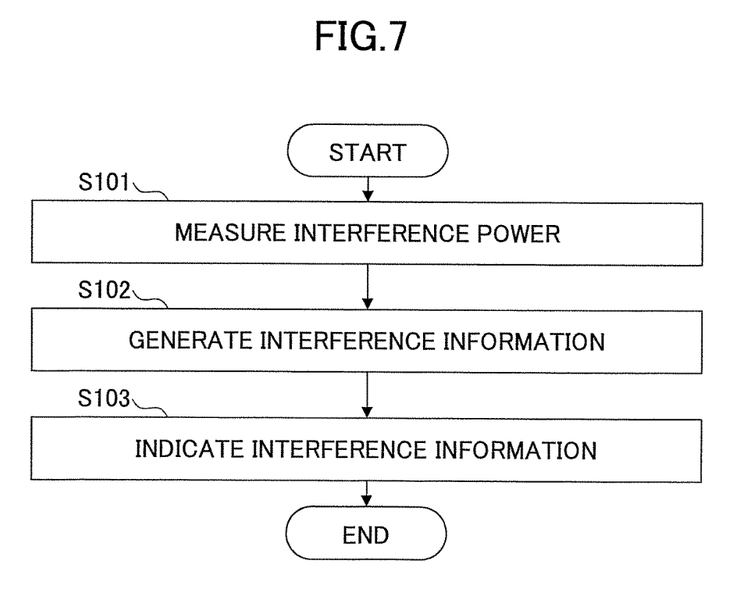
FIG. 7 is a flowchart for illustrating an interference information indication operation in user equipment according to one embodiment of the present invention.

Next, an interference information indication operation in the user equipment according to one embodiment of the present invention is described with reference to FIG. 7. FIG. 7 is a flowchart for illustrating an interference information indication operation in the user equipment according to one embodiment of the present invention.

As illustrated in FIG. 7, at step S101, the user equipment 100 measures reception quality of respective reference signals transmitted in directional beams in the interference beam candidate list provided from the camped base station 200A beforehand. The interference beam candidate list includes at least an interference beam candidate of the adjacent base station 200B that may interfere with the user equipment 100. For example, the interference beam candidate of the adjacent base station 200B may be directional beams transmitted from the adjacent base station 200B toward the camped base station 200A, or if the adjacent base station 200B obtains location information of the user equipment 100 from the camped base station 200A, the interference beam candidate of the adjacent base station 200B may be directional beams transmitted toward the user equipment 100. However, the present invention is not limited to it, and the user equipment 100 may not necessarily obtain the interference beam candidate list. In this case, the user equipment 100 may identify an interference level and/or a timing of stronger interference based on measurement results and indicate the identified interference level and/or timing of stronger interference as interference information to the camped base station 200A or the adjacent base station 200B. Upon receiving the interference information, the camped base station 200A or the adjacent base station 200B can identify an interference beam based on the received interference information.

At step S102, the user equipment 100 generates the interference information based on reception quality of the measured reference signals. The interference information may include one or more of a timing, a frequency position, a beam index and reception quality of interference from the adjacent base station 200B detected at the user equipment 100.

At step S103, the user equipment 100 indicates the generated interference information to the camped base station 200A or the adjacent base station 200B. In one embodiment, the user equipment 100 may multiplex the generated interference information into channel state information or acknowledgement and transmit the interference information multiplexed channel state information or acknowledgement to the camped base station 200A. Alternatively, for example, the user equipment 100 may multiplex the generated interference information into an uplink data channel and transmit the interference information multiplexed uplink data channel to the camped base station 200A. In another embodiment, the user equipment 100 may attach the interference information to a RACH for transmission to the adjacent base station 200B. Alternatively, the user equipment 100 may attach the interference information to a D2D signal for transmission to the adjacent base station 200B in inter-UE communication with other user equipments camping in the adjacent base station 200B.

Although the embodiments of the present invention have been described in detail, the present invention is not limited to the above-stated specific embodiments, and various modifications and variations can be made within the spirit of the present invention as recited in claims.

This international patent application claims benefit of priority based on Japanese Priority Application No. 2014-059184 filed on Mar. 20, 2014, the entire contents of which are hereby incorporated by reference.

LIST OF REFERENCE SYMBOLS

10: radio communication system
100: user equipment
200A: camped base station
200B: adjacent base station

The invention claimed is:

1. User equipment, comprising:
 a receiver that receives an interference beam candidate list including directional beams transmitted from a camped base station and interference beam candidates transmitted from an adjacent base station; and
 a processor that:
 measures reception quality of reference signals transmitted in the respective directional beams in the received interference beam candidate list; and
 generates interference information based on the measured reception quality; and
 a transmitter that transmits the generated interference information to the camped base station or the adjacent base station.

2. The user equipment as claimed in claim 1, wherein the transmitter transmits the interference information to the camped base station by multiplexing the interference information into channel state information or acknowledgement.

3. The user equipment as claimed in claim 1, wherein the transmitter transmits the interference information to the camped base station by multiplexing the interference information into an uplink data channel.

4. The user equipment as claimed in claim 1, wherein the transmitter transmits the interference information to the adjacent base station in a random access channel.

5. The user equipment as claimed in claim 1, wherein the transmitter transmits the interference information to the adjacent base station via a D2D (Device to Device) signal for transmission to user equipment camped in the adjacent base station.

6. The user equipment as claimed in claim 5, wherein the processor includes one or more of a timing, a frequency position, a beam index and reception quality of incurred interference in a payload of the D2D signal.

7. The user equipment as claimed in claim 1, wherein the respective directional beams in the interference beam candidate list are associated with indicators indicative of transmitter of the directional beams, and in response to an interference level of a reference signal transmitted in a directional beam from the adjacent base station being higher than or equal to a predetermined threshold, the transmitter transmits the generated interference information to the camped base station or the adjacent base station.

8. A base station camped in by user equipment, comprising:
 a transmitter that transmits an interference beam candidate list including directional beams transmitted from the base station and interference beam candidates transmitted from an adjacent base station to the user equipment and transmits reference signals in directional beams in the interference beam candidate list; and
 a processor that: acquires interference information from the user equipment; and
 controls transmission to the user equipment in cooperation with the adjacent base station based on the acquired interference information.

9. The base station as claimed in claim 8, wherein the processor controls transmission to the user equipment such that a transmission timing of an interference beam from the adjacent base station indicated in the interference information does not overlap with a transmission timing of each of the directional beams.

10. The base station as claimed in claim 8, wherein the transmitter transmits a signal that causes the adjacent base station to refrain from transmitting an interference beam of the adjacent base station indicated in the interference information at an indicated timing or period.

* * * * *